Dec. 19, 1922.
G. V. BARNES.
SEAT CONSTRUCTION.
FILED MAY 16, 1922.
1,439,219.
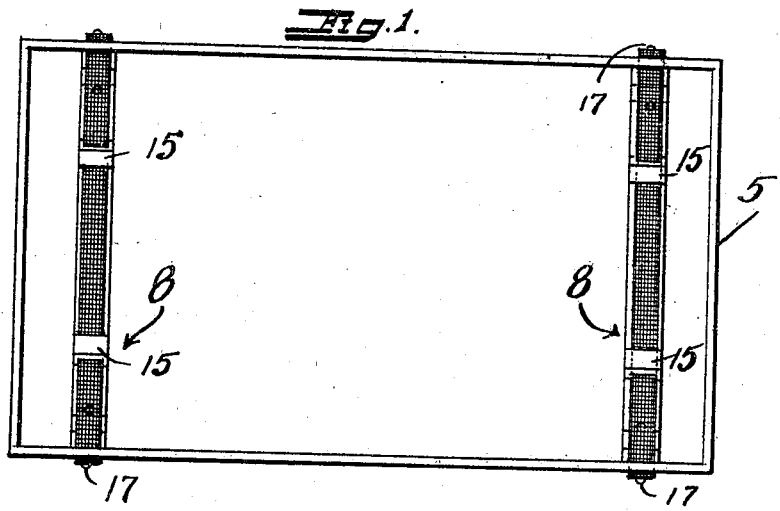
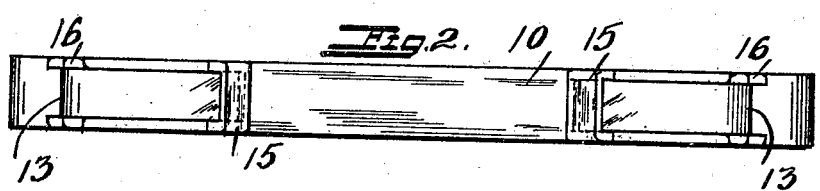
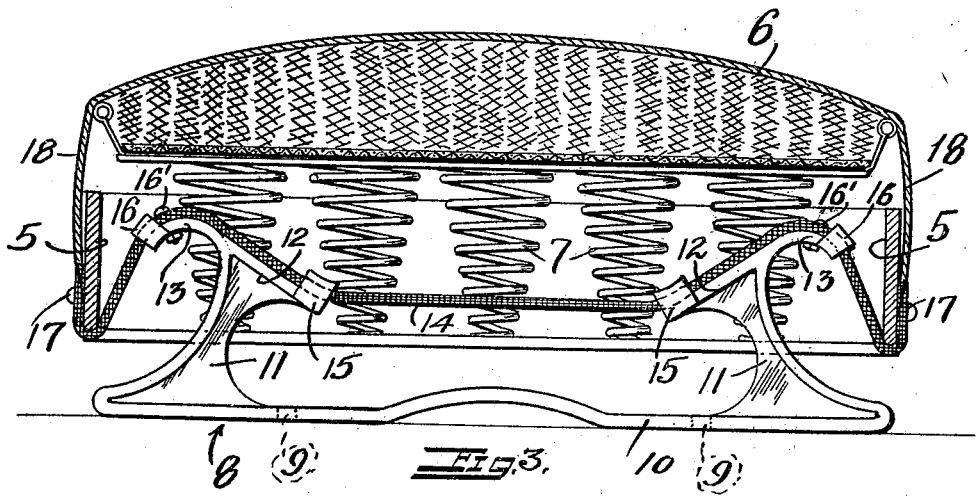
INVENTOR
Gaylord V. Barnes.
BY
ATTORNEYS Patented Dec. 19, 1922.

1,439,219

UNITED STATES PATENT OFFICE.

GAYLORD V. BARNES, OF ALAMEDA, CALIFORNIA.

SEAT CONSTRUCTION.

Application filed May 16, 1922. Serial No. 561,343.

*To all whom it may concern:*

Be it known that I, GAYLORD V. BARNES, a citizen of the United States, and a resident of Alameda, county of Alameda, and State of California, have invented a new and useful Seat Construction, of which the following is a specification.

My invention relates in general to seats for vehicles, street cars and other conveyances, and has reference more particularly to a seat mounting or suspension.

The primary object of my invention is to provide means for absorbing, so to speak, lateral jolts and shocks experienced in a vehicle which are not ordinarily taken up or absorbed by the springs of the vehicle or the customary cushion springs. As heretofore practiced in seats the upholstered part of the cushion is usually provided with shock absorbing springs which, working together with the springs of the vehicle body or running gear, tend to relieve the occupants of vertical jolts and shocks experienced when the vehicle traverses a more or less rough road surface or uneven road bed, as in the case of railways, but these spring devices are not adequate to absorb the so-called lateral or horizontal shocks or jars which are caused by irregularities in the road surface or road bed, as well as sudden stopping or starting of the vehicle and other like conditions present in running the vehicle.

With my invention these lateral or horizontal shocks or jolts are relieved and the person occupying the seat equipped with my invention would not experience the discomforts noticed when the ordinary seat construction is used.

In the accompanying drawing, Figure 1 is a plan view of the frame which is adapted to receive the upholstered cushion and showing the manner of mounting or supporting the same by my improved strap suspension; Figure 2 is a plan view of one of the bridge castings, and Figure 3 is a view in vertical section of a seat construction with my improved strap suspension as applied thereto.

Referring now to the drawing in detail, (5) represents a seat frame ordinarily employed as a mounting for the cushion (6) as well as a housing for the springs (7), which support the cushion above the frame and are made to absorb and relieve vertical shocks and jolts so that the person occupying the seat may ride with comfort so far as jolts in a vertical direction are concerned.

According to the preferred form of my invention it is proposed to provide a pair of bridge members (8) which are supported over the base of the seat in any desired manner, for instance, by providing openings (9) made to receive upstanding pins on the base mounting for the seat (not shown). Each of the bridge members preferably comprises a casting formed with a base strip (10) and with upstanding webs (11) at opposite ends of the strip (10) with the upper edges (12) of the webs (11) arranged at a slant to the horizontal position of the seat, and with their outwardly presented ends (13) curved downwardly.

The bridge members are positioned, as stated, at opposite ends of the seat frame and transversely thereof, and with the webs extending within the frame as best shown in Figure 3. The edges (12) of the webs (11) are made to leave a relatively narrow, flat, surface over which straps (14) are passed, with the length of the straps intermediate the ends stretched across the space between the lower ends of the edges (12), as also best shown in Figure 3. To hold the straps on the edges (12) a keeper (15) is made on each of the lower ends of the edges, under which the straps pass, and a second set of keepers (16) are also provided at the end of the downwardly presented portion of the edges. To keep the strap from slipping I prefer to rivet or bolt the same to the upper edges of the webs by bolts, rivets or the like, as shown at (16'). The respective ends of the straps pass under the lower edges of the front and back of the frame (5), with their extremities riveted or otherwise fixed to the frame as at (17).

The upholstering material of the cushion overlaps the frame as at (18) in the customary manner. With this construction I am enabled to virtually support the seat by the straps (14), and since the straps are flexible the seat is capable of an oscillating movement, or rather a fore-and-aft tilting or rocking movement. Thus all lateral or horizontal shocks may be overcome, adding to the easy riding qualities of the seat.

I claim:

1. In a seat construction of the class described, a frame, means for mounting the seat on said frame whereby it may absorb and overcome horizontal shocks, comprising a plurality of transversely spaced-apart bridge members, each of said bridge members comprising a base strip, webs extending upwardly at opposite ends of said strip the upper edges of said webs being formed at a slant to the horizontal, with their outer extremities curved downwardly, a flexible strap for each bridge member bridging the space between the webs thereof and passing over said slanting edges, the ends of said straps extending over and beyond the downwardly curved portion of the web edges and connected to the front and back of said frame, substantially as and for the purpose described.

2. In a seat construction of the class described, a frame, means for mounting the seat on said frame whereby it may absorb and overcome horizontal shocks, comprising a plurality of transversely spaced-apart bridge members, each of said bridge members comprising a base strip, webs extending upwardly at opposite ends of said strip the upper edges of said webs being formed at a slant to the horizontal, with their outer extremities curved downwardly, a flexible strap for each bridge member bridging the space between the webs thereof and passing over said slanting edges, the ends of said straps extending over and beyond the downwardly curved portion of the web edges and connected to the front and back of said frame, and keepers on the upper edges of the said webs under which the straps pass for holding the straps upon the edges of the webs, substantially as and for the purpose described.

3. In a seat construction of the class described, a frame, means for mounting the seat on said frame whereby it may absorb and overcome horizontal shocks, comprising a plurality of transversely spaced-apart bridge members, each of said bridge members comprising a casting having a base strip, webs extending upwardly at opposite ends of said strip the upper edges of said webs being formed at a slant to the horizontal, with their outer extremities curved downwardly, a flexible strap for each bridge member bridging the space between the webs thereof and passing over said slanting edges, the ends of said straps extending over and beyond the downwardly curved portion of the web edges and connected to the front and back of said frame, and keepers on the upper edges of the said webs under which the straps pass for holding the straps upon the edges of the webs, substantially as and for the purpose described.

GAYLORD V. BARNES.